US012266311B2

(12) United States Patent
Feng et al.

(10) Patent No.: US 12,266,311 B2
(45) Date of Patent: Apr. 1, 2025

(54) COMPENSATION METHOD, SYSTEM, DEVICE AND MEDIUM OF IR DROP OF DISPLAY PANEL

(71) Applicant: Hefei University of Technology, Hefei (CN)

(72) Inventors: Qibin Feng, Hefei (CN); Hongtao Ren, Hefei (CN); Chen Zheng, Hefei (CN); Guoqiang Lv, Hefei (CN); Zi Wang, Hefei (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 18/542,774

(22) Filed: Dec. 18, 2023

(65) Prior Publication Data

US 2025/0078761 A1 Mar. 6, 2025

(30) Foreign Application Priority Data

Aug. 28, 2023 (CN) ......................... 202311094908.9

(51) Int. Cl.
*G09G 3/3258* (2016.01)
*G09G 3/3233* (2016.01)

(52) U.S. Cl.
CPC ......... *G09G 3/3258* (2013.01); *G09G 3/3233* (2013.01); *G09G 2320/0223* (2013.01); *G09G 2320/0233* (2013.01)

(58) Field of Classification Search
CPC ............... G09G 3/3258; G09G 3/3233; G09G 2320/0223; G09G 2320/0233
See application file for complete search history.

(56) References Cited

U.S. PATENT DOCUMENTS

2006/0145969 A1* 7/2006 Fish ..................... G09G 3/3233 345/77
2006/0158445 A1* 7/2006 Hamamoto .............. G09G 3/22 345/211

* cited by examiner

*Primary Examiner* — Peter D McLoone

(57) ABSTRACT

The disclosure provides a compensation method, system, device and medium of a IR Drop of a display panel. The compensation method includes: constructing a IR Drop model of the display panel based on a distribution of equivalent resistances between adjacent pixels in the display panel; constructing a vector matrix equation of the IR Drop according to the IR Drop model; performing an equivalent processing on the vector matrix equation of the IR Drop to form a plurality of equivalent sub-matrices; iteratively solving IR Drop data of each node in each equivalent sub-matrix; and performing a voltage compensation on each pixel in the display panel according to the IR Drop data. The disclosure may realize a point-to-point accurate compensation of all nodes in the display panel, and improves a problem of uneven brightness of a high-resolution display panel caused by the IR Drop.

9 Claims, 5 Drawing Sheets

COMPENSATION METHOD, SYSTEM, DEVICE AND MEDIUM OF IR DROP OF DISPLAY PANEL

CROSS REFERENCE TO RELATED APPLICATION

The present application claims the priority of the following Chinese patent applications: serial No. CN202311094908.9, filed Aug. 28, 2023; the disclosure of which is hereby incorporated by reference herein in its entirety for all purposes.

TECHNICAL FIELD

The disclosure relates to a field of display technology, in particular to a compensation method, system, device and medium of an IR Drop of a display panel.

BACKGROUND

OLED (Organic Light Emitting diode) display panel is a current-driven component. When the pixels of the OLED display panel are lighted, the current flowing through the power metal wires will generate a voltage drop (IR Drop), thereby causing the uneven display brightness of OLED display, which adversely affects the display effect. In the conventional technology, an external compensation usually has the problem of inaccurate current sensing, and the uneven display brightness caused by the IR Drop of the display panel cannot be completely compensated.

SUMMARY

The disclosure provides a compensation method, system, device of an IR Drop of a display panel to solve a problem of uneven display brightness caused by the IR Drop I in the conventional art.

The disclosure provides the compensation method of the IR Drop of the display panel, including:

- constructing a IR Drop model of the display panel based on a distribution of equivalent resistances between adjacent pixels in the display panel;
- constructing a vector matrix equation of the IR Drop according to the IR Drop model;
- performing an equivalent processing on the vector matrix equation of the IR Drop to form a plurality of equivalent sub-matrices, wherein, the equivalent sub-matrix is stored using a sparse algorithm;
- iteratively solving IR Drop data of each node in each equivalent sub-matrix; and
- performing a voltage compensation on each pixel in the display panel according to the IR Drop data.

In an embodiment of the disclosure, constructing the IR Drop model of the display panel based on the distribution of equivalent resistances between adjacent pixels in the display panel includes:

- calculating the equivalent resistance between adjacent pixels in the display panel, and
- constructing the IR Drop model of the display panel according to all of the equivalent resistances.

In an embodiment of the disclosure, the compensation method of the IR Drop of the display panel according to claim 1, wherein, in an operation of constructing the vector matrix equation of the IR Drop according to the IR Drop model, the vector matrix equation of the IR Drop satisfies a following formula:

$$Gv=I$$

- wherein, G represents a conductance matrix, v represents a vector matrix consisting of node voltages, and I represents a vector matrix containing a current.

In an embodiment of the disclosure, a conductance value of each node in the equivalent sub-matrix satisfies a following formula:

$$g = \frac{2}{R_{TD} + R_{EL}} + \frac{2}{R_{MD} + R_{EL}}$$

wherein, $R_{TD}$ represents an equivalent resistance of a horizontal power supply metal wire in the node, $R_{MD}$ represents an equivalent resistance of a longitudinal power supply metal wire in the node, and $R_{EL}$ represents an equivalent resistance of the pixel in the node.

In an embodiment of the disclosure, a current value of each node in the equivalent sub-matrix satisfies a following formula:

$$I_{(x_i,y_i)}{}^{k+1} = -I_{(x_i,y_i)}{}^{k} + (v_{(x_i-1,y_i)}{}^{k+1} + v_{(x_i+1,y_i)}{}^{k}) \times g_{MD}$$

wherein, k represents a number of iterative solutions, $v_{(xi+1,\ yi)}$ represents a node voltage of a node $(x_i+1, y_i)$, $v_{(xi-1,\ yi)}$ represents a node voltage of the node $(x_i-1, y_i)$, and $g_{MD}$ represents a longitudinal conductance of the node $(x_i+1, y_i)$.

In an embodiment of the disclosure, iteratively solving IR Drop data of each node in each equivalent sub-matrix includes:

- iteratively solving the vector matrix equation of the IR Drop to generate an iterative value of a node voltage and a node current of each of the nodes;
- when an error between two adjacent iteration values is less than a preset iteration error, recording an iteration value generated by a latest iteration as a node voltage value of each node, and calculating and generating the IR Drop data of all the nodes.

In an embodiment of the disclosure, in an operation of performing an equivalent processing on the vector matrix equation of the IR Drop to form a plurality of equivalent sub-matrices, the equivalent sub-matrix is stored using a sparse algorithm.

The disclosure further provides a compensation system of an IR Drop of a display panel, including a model construction module, a matrix construction module, an equivalent processing module, an iterative solution module and a node compensation module.

The model construction module is configured to construct an IR Drop model of the display panel based on a distribution of equivalent resistances between adjacent pixels in the display panel.

The matrix construction module is configured to construct a vector matrix equation of the IR Drop according to the IR Drop model.

The equivalent processing module is configured to perform an equivalent processing on the vector matrix equation of the IR Drop to form a plurality of equivalent sub-matrices.

The iterative solution module is configured to iteratively solve IR Drop data of each node in each equivalent sub-matrix.

The node compensation module is configured to perform a voltage compensation on each pixel in the display panel according to the IR Drop data.

The disclosure further provides a computer device, including a memory, a processor and a computer program stored in the memory and executable on the processor. When the processor executes the computer program, the operations of the compensation method of the IR Drop of the display panel as described in any one of the above are implemented.

The disclosure further provides a computer-readable storage medium. The computer-readable storage medium stores the computer program. When the computer program is executed by a processor, the operations of the compensation method of the IR Drop of the display panel as described in any one of the above are implemented.

As mentioned above, the compensation method, system, device and medium of the IR Drop of the display panel of the disclosure have following beneficial effects: the disclosure may accurately solve the IR Drop of each node of the display panel, and may realize a point-to-point accurate voltage compensate to enable the display brightness to be uniform due to IR Drop on the display panel.

DETAILED DESCRIPTION

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure. It should be noted that, the following embodiments and the features in the embodiments can be combined with each other without conflict. It should further be understood that the terms used in the examples of the disclosure are used to describe specific embodiments, instead of limiting the protection scope of the disclosure. The test methods that do not indicate specific conditions in the following examples are usually in accordance with conventional conditions, or conditions recommended by each manufacturer.

It should be noted that structures, proportions, sizes, etc. shown in drawings attached to this specification are only used to match content disclosed in the specification and are for understanding and reading of people familiar with this technology. They are not used to limit an implementation of the disclosure. Therefore, it has no technical substantive significance. Any modification of structure, change of proportional or adjustment of size shall still fall within a scope of this disclosure without affecting an effect that the disclosure can produce and the purpose that can be achieved. At the same time, it should be noted that the terms such as "upper", "lower", "left", "right", "middle" and "one" cited in this specification are only for the convenience of description and are not used to limit the scope of the disclosure. The change or adjustment of the relative relationship should also be regarded as the applicable scope of the disclosure without substantial change in the technical content.

Please refer to FIG. 1 through FIG. 7. The disclosure provides a compensation method, system, device and medium of an IR Drop of a display panel, relating to a field of display technology. The disclosure may be specifically applied to improve a problem of uneven display brightness of OLED (Organic Light Emitting diode) display panel. The disclosure characterizes an IR Drop model along the power cable in the OLED display panel by constructing a vector matrix equation, and uses sparse representations in a field of artificial intelligence to solve a large-scale circuit model, thereby achieving an accurate point-to-point compensation. The disclosure may improve a problem of uneven brightness of the OLED display panel caused by the IR Drop, which improves display effect of the display panel. Detailed description will be given below through specific embodiments.

Figure 1:
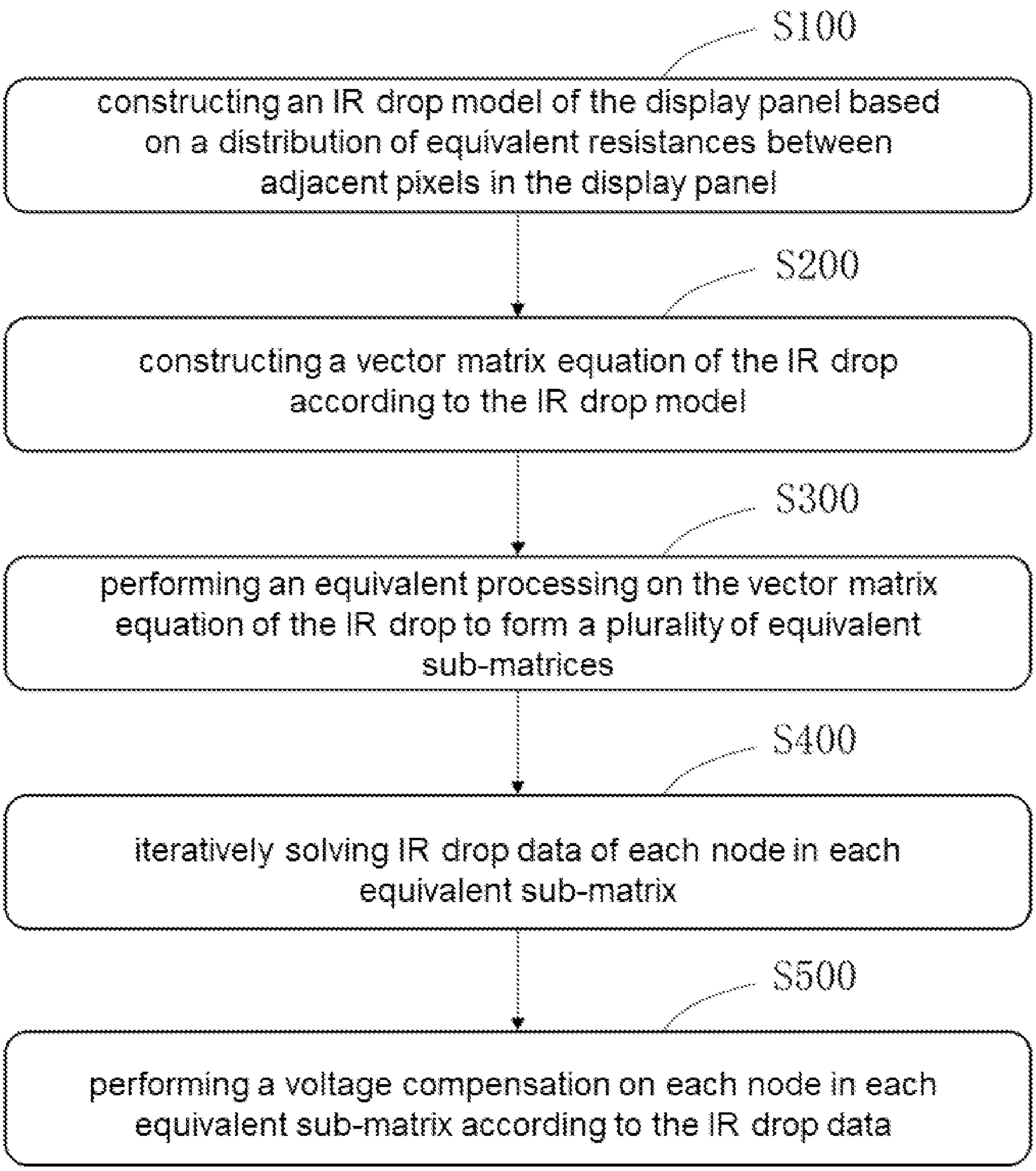
FIG. 1 is a schematic flowchart of a compensation method of an IR Drop of a display panel according to the disclosure.

Please refer to FIG. 1. FIG. 1 is a schematic flowchart of a compensation method of a IR Drop of a display panel according to the disclosure, including:

- S100, constructing a IR Drop model of the display panel based on a distribution of equivalent resistances between adjacent pixels in the display panel;
- S200, constructing a vector matrix equation of the IR Drop according to the IR Drop model;
- S300, performing an equivalent processing on the vector matrix equation of the IR Drop to form a plurality of equivalent sub-matrices;
- S400, iteratively solving IR Drop data of each node in each equivalent sub-matrix; and
- S500, performing a voltage compensation on each node in each equivalent sub-matrix according to the IR Drop data.

Figure 2:
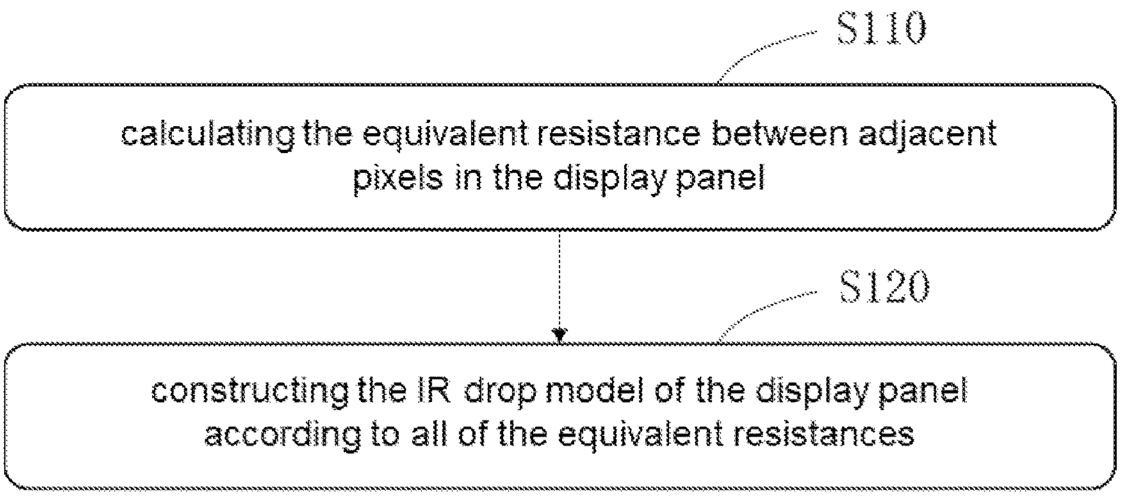
FIG. 2 is a specific schematic flowchart of S100 in FIG. 1.

Please refer to FIG. 2. FIG. 2 is a specific schematic flowchart of S100 in FIG. 1. In an embodiment of the disclosure, executing S100 means that constructing the IR Drop model of the display panel based on the distribution of equivalent resistances between adjacent pixels in the display panel. Specifically, S100 may include following operations:

- S110, calculating the equivalent resistance between adjacent pixels in the display panel; and
- S120, constructing the IR Drop model of the display panel according to all of the equivalent resistances.

In an embodiment of the disclosure, executing S110 means that calculating the equivalent resistance between adjacent pixels in the display panel. Specifically, the equivalent resistance between adjacent pixels in the display panel may characterize a sheet resistance of a power supply metal wire between two adjacent pixels. A resistance value of the equivalent resistance is a function of a length, width, height and resistivity of the power supply metal wire. In this embodiment, the equivalent resistance between adjacent pixels may be divided into two directions: horizontal and vertical resistances, which means an equivalent resistance of a horizontal power supply metal wire and an equivalent resistance of a vertical power supply metal wire. An equivalent resistance $R_{TD}$ of the horizontal power supply metal wire may satisfy the following formula:

$$R_{TD} = \rho \times \frac{l_{MD}}{h_{TD} w_{TD}}$$

The equivalent resistance $R_{MD}$ of the vertical power supply metal wire may satisfy the following formula:

$$R_{MD} = \rho \times \frac{l_{TD}}{h_{MD} w_{MD}}$$

Wherein, $l_{TD}$ represents a length of the horizontal power supply metal wire, $h_{TD}$ represents a height of the horizontal power supply metal wire, $w_{TD}$ represents a wire width of the horizontal power supply metal wire, Imp represents a length of the vertical power supply metal wire, $h_{MD}$ represents a height of the vertical power supply metal wire, $w_{MD}$ represents a wire width of the vertical power supply metal wire, p represents a resistivity of horizontal and vertical power supply metal wires.

Furthermore, the power supply metal wires that connect the display panel to a working voltage (VDD) adopt same specifications. It may be seen that due to different lengths of the power supply metal wires in different directions, resistance values of the horizontal and vertical power supply metal wires will also be different. In this embodiment, the equivalent resistance $R_{TD}$ of the horizontal power supply metal wire of the adjacent pixels in the display panel may be simplified as:

$$R_{TD} = R_{VDD} \times \frac{l_{MD}}{l_{TD}}$$

The equivalent resistance $R_{MD}$ of the vertical power supply metal wire of the adjacent pixels in the display panel may be simplified as:

$$R_{MD} = R_{VDD} \times \frac{l_{TD}}{l_{MD}}$$

Wherein, $R_{VDD}$ represents the resistance value of the power supply metal wire between two adjacent pixels. In this embodiment, the resistance value $R_{VDD}$ of the metal power wire used for the working voltage may be 0.5Ω, the length $l_{TD}$ of the horizontal power metal wire may be set to 132.03 mm, and the length $l_{MD}$ of the vertical power metal wire may be set to 132.78 mm.

In an embodiment of the disclosure, executing S120 means that constructing the IR Drop model of the display panel according to all of the equivalent resistances. Specifically, a resolution of the display panel may be set to be M×N, which means that the display panel has M columns of pixels in a horizontal direction and N rows of pixels in a vertical direction. According to the equivalent resistance between all adjacent pixels calculated in S110, the IR Drop model of the display panel is constructed. In this embodiment, the IR Drop model may be a resistive static IR Drop analysis network including P×Q nodes. Wherein, P represents a total number of horizontal nodes in the IR Drop model, and P is equal to a lateral resolution of the display panel, which means that P=M. Q represents a total number of longitudinal nodes in a IR Drop model, and Q is equal to a longitudinal resolution of the display panel, which means that Q=N.

Further, a typical pixel circuit consists of two TFTs (Thin Film Transistor) and a capacitor, wherein, a driving thin film transistor (DTFT) controls a driving current passing through the OLED under a given lighting level by changing a gate voltage. Therefore, an electronic component in pixels of the OLED display panel may be simplified as a current source driven by DTFT, which means that a current-driven OLED display panel may be equivalently expressed as the current source in the above IR Drop model, then a total number of load current sources is P×Q. The voltage source is horizontally connected with the display panel, and a total number of voltage sources must be greater than 1.

In an embodiment of the disclosure, executing S200 means constructing the vector matrix equation of the IR Drop according to the IR Drop model. Specifically, the IR Drop model includes P×Q nodes, therefore, the IR Drop vector matrix is a P×Q matrix. In this embodiment, the vector matrix equation of the IR Drop of the display panel may satisfy the following formula:

$$Gv=I$$

wherein, G represents a conductance matrix, v represents a vector matrix consisting of node voltages, and I represents a vector matrix containing a current. It may be seen that the conductance matrix includes P×Q nodes.

Figure 3:
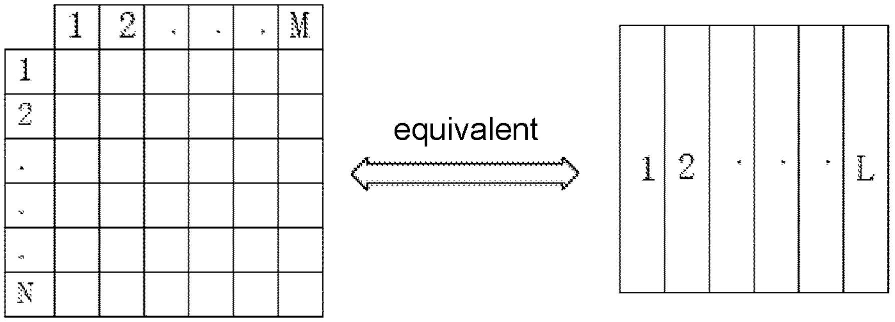
FIG. 3 is a schematic flowchart of an equivalent processing according to an embodiment of the disclosure.

Please refer to FIG. 3. FIG. 3 is a schematic flowchart of an equivalent processing according to an embodiment of the disclosure. In an embodiment of the disclosure, executing S300 means performing the equivalent processing on the vector matrix equation of the IR Drop to form the plurality of equivalent sub-matrices. Specifically, the conductance matrix G in the vector matrix equation of the IR Drop is equivalently processed along a power supply direction of the voltage source to form the plurality of equivalent sub-matrices Gi. For example, a number of equivalent sub-matrices $G_i$ may be L, where L is an integer and L≥1. Therefore, for an i-th equivalent sub-matrix $G_i$ (i=1, . . . , L), a total number of horizontal nodes it contains is P/L, and a total number of longitudinal nodes it contains is Q. Nodes in the i-th equivalent sub-matrix $G_i$ may be expressed as ($x_i$, $y_i$), wherein, $x_i$=1, . . . , P/L; $y_i$=1, . . . , Q.

In this embodiment, for the node ($x_i$, $y_i$) in the i-th equivalent sub-matrix Gi, a transverse conductance $g_{TD}$ between it and an adjacent node may satisfy the following formula:

$$g_{TD} = \frac{-1}{R_{TD} + R_{EL}}$$

For the node ($x_i$, $y_i$) in the i-th equivalent sub-matrix Gi, a vertical conductance $g_{TD}$ between it and an adjacent node may satisfy the following formula:

$$g_{MD} = \frac{-1}{R_{MD} + R_{EL}}$$

Therefore, a total conductance value g of this node (xi, yi) may be expressed as:

$$g = \frac{2}{R_{TD} + R_{EL}} + \frac{2}{R_{MD} + R_{EL}}$$

Wherein, $R_{EL}$ represents an equivalent resistance of the pixel in each node. The equivalent resistance $R_{EL}$ of the pixel may be set to 4.19×10^6Ω.

In this embodiment, a total current value $I_{(xi,\ yi)}$ passing through this node $(x_i, y_i)$ may satisfy the following formula:

$$I_{(x_i,y_i)}{}^{k+1} = -I_{(x_i,y_i)}{}^{k} + (v_{(x_i-1,y_i)}{}^{k+1} + v_{(x_i+1,y_i)}{}^{k}) \times g_{MD}$$

wherein, k represents a number of iterative solutions, $v_{(xi+1,\ yi)}$ represents a node voltage of a node $(x_i+1, y_i)$, and $v_{(xi-1,\ yi)}$ represents a node voltage of a node $(x_i-1, y_i)$.

In an embodiment of the disclosure, the resolution of the display panel may be, for example, 7680×4320, so there are a total of 7680×4320 nodes in the IR Drop model. The conductance matrix G is equivalently processed along the power supply direction of the voltage source to form L equivalent sub-matrices Gi. The equivalent sub-matrix Gi may be expressed as:

$$G_i = \begin{bmatrix} G'_{1,1} & C_1 & 0 & \dots & 0 \\ C_1 & G_{2,2} & C_2 & \ddots & \vdots \\ 0 & C_2 & \ddots & \ddots & 0 \\ \vdots & \ddots & \ddots & G'_{y-1,y-1} & C_{y-1} \\ 0 & \dots & 0 & C_{y-1} & G'_{y,y} \end{bmatrix}$$

In this embodiment, the number L of equivalent sub-matrices may be, for example, 768. Then the total number of horizontal nodes in the i-th equivalent sub-matrix $G_i$(i=1, . . . , 768) is 10, and the total number of the longitudinal nodes is 4320. At this time, each node in the i-th equivalent sub-matrix Gi may be expressed as $(x_i, y_i)$, wherein, $x_i$=1, . . . , 10; $y_i$=1, . . . , 4320. The voltage source may be a stable DC voltage source, and its voltage value U may be set to 24V. Therefore the total number of voltage sources may be 10 and the total number of load current sources may be 43200. An initial current value of the load current source may be $2.446\times10^{-6}$ A.

It should be noted that the equivalent sub-matrix $G_i$ in the above operations is of order $x^2 \times y^2$. When the resolution of the OLED display panel is low, the order of its equivalent sub-matrix $G_i$ is also low, and conventional algorithms may be used for calculation. When the resolution of the OLED display panel increases, the order of its equivalent sub-matrix $G_i$ increases, and there are fewer non-zero elements in the equivalent sub-matrix $G_i$. If the conventional algorithm is used to solve the problem, a large number of zero elements need to be stored, and solving it will consume a lot of operation time and memory, and may even be unsolvable.

In an embodiment of the disclosure, sparse algorithm is used to store equivalent sub-matrices $G_i$. A sparse algorithm storage may selectively store only non-zero elements in the equivalent sub-matrix $G_i$. The sparse algorithm storage records rows, columns and values of the non-zero elements in a small-scale array, thereby reducing a size of the matrix and enabling it to be possible to accurately solve the IR Drop of each pixel at a high resolution. In this embodiment, when the sparse algorithm storage is used, a first column of the equivalent sub-matrix $G_i$ may be expressed as:

$$G_1 = \begin{bmatrix} (1,1)g \\ (2,1)g_{TD} \\ (y+1,1)g_{MD} \\ \vdots \\ (y-1,n)g_{TD} \\ (y,y)g \\ (2y,y)g_{MD} \end{bmatrix}$$

Figure 4:
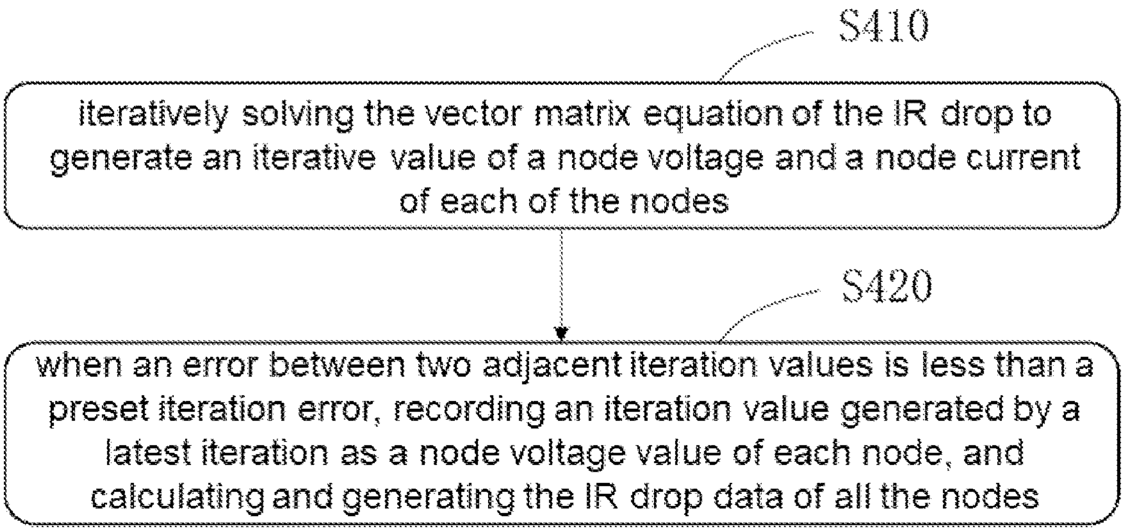
FIG. 4 is a specific schematic flowchart of S400 in FIG. 1.

Please refer to FIG. 4. FIG. 4 is a specific schematic flowchart of S400 in FIG. 1. In an embodiment of the disclosure, executing S400 means iteratively solving IR Drop data of each node in each equivalent sub-matrix. Specifically, S400 may include following operations:

S410, iteratively solving the vector matrix equation of the IR Drop to generate an iterative value of a node voltage and a node current of each of the nodes;

S420, when an error between two adjacent iteration values is less than a preset iteration error, recording an iteration value generated by a latest iteration as a node voltage value of each node, and calculating and generating the IR Drop data of all the nodes.

Figure 5:
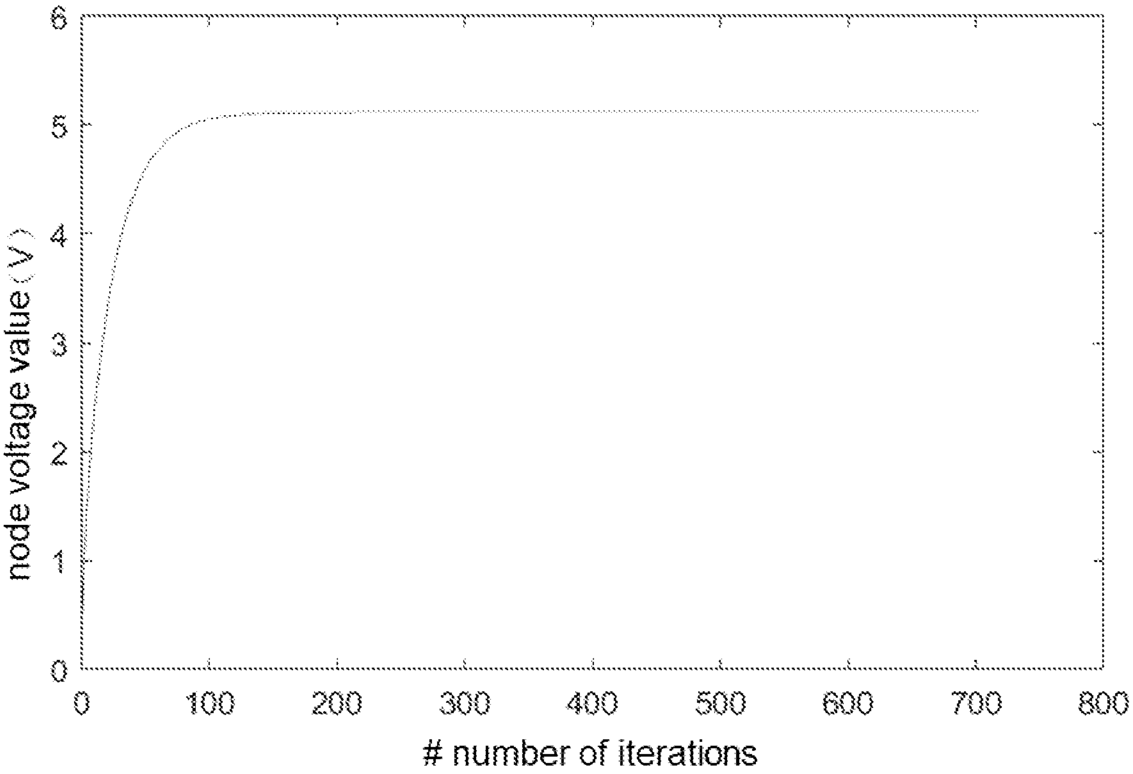
FIG. 5 is a schematic view of an iterative solution process according to an embodiment of the disclosure.

Please refer to FIG. 5. FIG. 5 is a schematic view of an iterative solution process according to an embodiment of the disclosure. In an embodiment of the disclosure, S410 to S420 are executed. Specifically, first, iterative solution is performed based on the vector matrix equation of the above IR Drop model to generate iterative values of a node voltage and a node current of each node in each equivalent sub-matrix, which means a node voltage matrix $v_i$ and node current matrix $I_i$ of each equivalent sub-matrix. Since a conductance matrix G in a vector matrix equation Gv=I of the IR Drop model is a strictly diagonally dominant matrix, an iterative method converges for any given initial value. It may be seen that when the vector matrix equation of the IR Drop model converges iteratively, the solution $v^{k+1}$ will be closer to the solution of the original equation than the solution $v^k$, so $v^k$ may be replaced with $v^{k+1}$ in time during an iterative process to obtain a more accurate node voltage value. In this embodiment, when an iteration error of two consecutive iteration values is less than a preset iteration error eps, the current iteration result may be used as a real node voltage value to perform a IR Drop analysis, which means that the iteration value generated by a latest iteration is recorded as the node voltage value of each node. In this embodiment, the iteration error eps may be set to equal to $10^{-5}$, ensuring that the node voltage value of each pixel converges to an exact solution after iteration.

Furthermore, based on the node voltage value of each node, the IR Drop of each node in the equivalent sub-matrix may be analyzed and calculated, thereby obtaining the IR Drop data of each pixel in the M×N resolution OLED display panel.

In an embodiment of the disclosure, executing S500 means performing the voltage compensation on each node in each equivalent sub-matrix according to the IR Drop data. Specifically, according to the IR Drop data of each node in the display panel obtained by solving in S400, the accurate point-to-point voltage compensation is performed for each pixel, thereby improving the problem of uneven brightness of the high-resolution OLED display panel caused by the IR Drop, which improves the display effect of the display panel.

Figure 6:
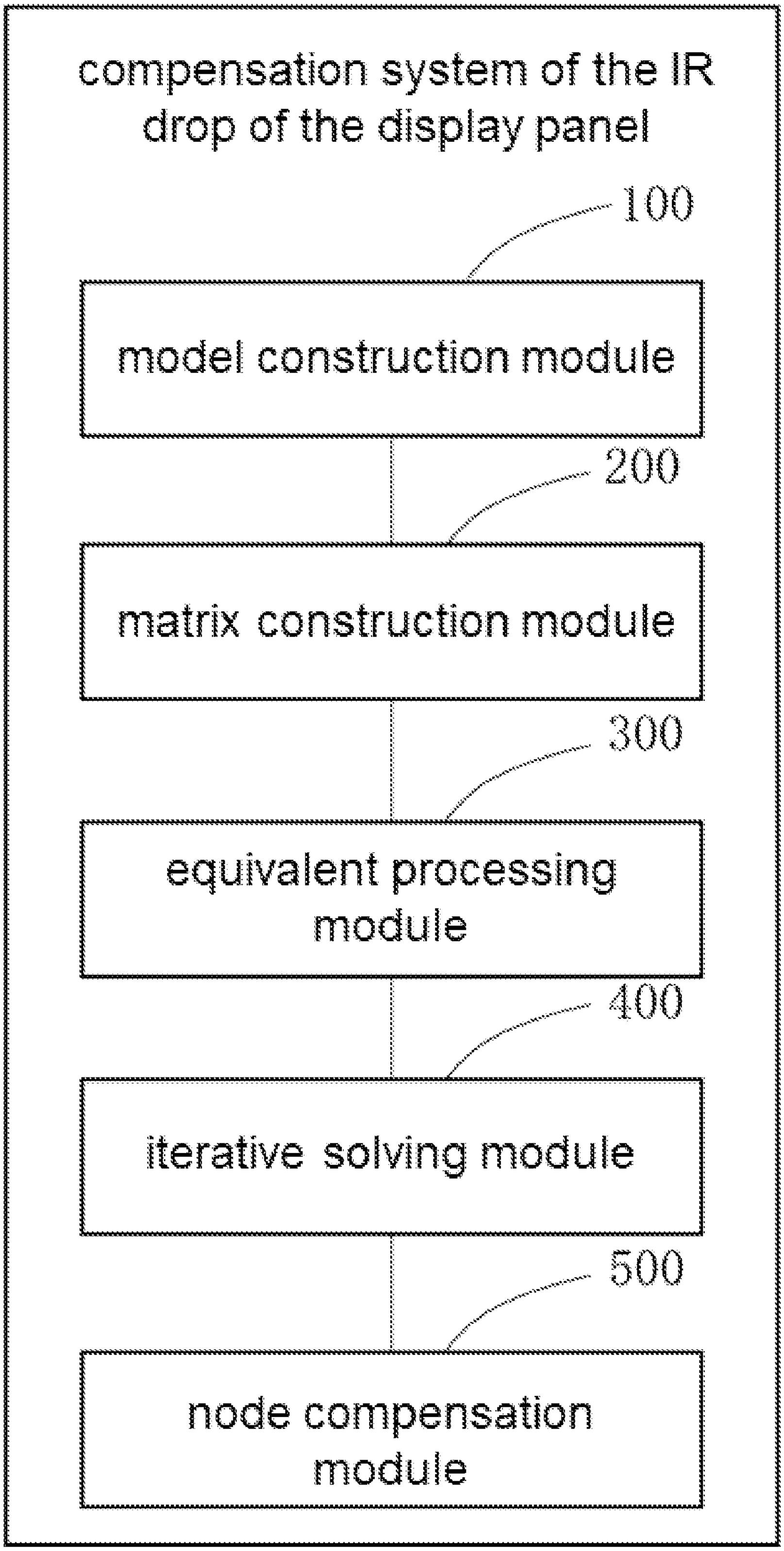
FIG. 6 is a schematic structural view of a compensation system of the IR Drop of the display panel according to the disclosure.

Please refer to FIG. 6. FIG. 6 is a schematic structural view of the compensation system of the IR Drop of the display panel according to the disclosure. This compensation system corresponds one-to-one to the compensation method in the above embodiment. The compensation system may include a model construction module 100, a matrix construction module 200, an equivalent processing module 300, an iterative solving module 400, and a node compensation module 500. Detailed descriptions of each functional module are as follows:

In an embodiment of the disclosure, the model construction module 100 is used for constructing the IR Drop model of the display panel based on the distribution of equivalent resistances between adjacent pixels in the display panel.

Specifically, first, the equivalent resistance between adjacent pixels in the display panel is calculated. The equivalent resistance between the adjacent pixels in the display panel may characterize the sheet resistance of the power supply metal wire between two adjacent pixels, which includes the equivalent resistances of the horizontal power supply metal wire and the vertical power supply metal wire. Then, the IR Drop model of the display panel is constructed according to all of the equivalent resistances. The IR Drop model may be a resistive static IR Drop analysis network including PxQ nodes.

In a specific embodiment, the model construction module 100 may also be specifically used to:

calculating the equivalent resistance between adjacent pixels in the display panel;

constructing the IR Drop model of the display panel according to all of the equivalent resistances.

In an embodiment of the disclosure, the matrix construction module 200 is used to construct the vector matrix equation of the IR Drop according to the IR Drop model. Specifically, the IR Drop model includes P×Q nodes, therefore, the IR Drop vector matrix is a P×Q matrix. In this embodiment, the vector matrix equation of the IR Drop of the display panel may satisfy the following formula:

$$Gv=I$$

wherein, G represents a conductance matrix, v represents a vector matrix consisting of node voltages, and I represents a vector matrix containing a current.

In an embodiment of the disclosure, the equivalent processing module 300 is used for performing the equivalent processing on the vector matrix equation of the IR Drop to form the plurality of equivalent sub-matrices. Specifically, first, the conductance matrix G in the vector matrix equation of the IR Drop is equivalently processed along a power supply direction of the voltage source to form the plurality of equivalent sub-matrices $G_i$. Then, a total conductance value g of each node in each equivalent sub-matrix $G_i$ and a total current value I flowing through the node are calculated. At last, the sparse algorithm is used to store equivalent sub-matrices $G_i$.

In an embodiment of the disclosure, the iterative solution module 400 is used for iteratively solving IR Drop data of each node in each equivalent sub-matrix. Specifically, first, iterative solution is performed based on the vector matrix equation of the above IR Drop model to generate iterative values of a node voltage and a node current of each node in each equivalent sub-matrix. When the iteration error of two consecutive iteration values is less than the preset iteration error eps, the current iteration result may be used as the real node voltage value to perform the IR Drop analysis, which means that the iteration value generated by the latest iteration is recorded as the node voltage value of each node. Based on the node voltage value of each node, the IR Drop of each node in the equivalent sub-matrix may be analyzed and calculated, thereby obtaining the IR Drop data of each pixel in the M×N resolution OLED display panel.

In a specific embodiment, the iterative solution module 400 may also be specifically used to:

iteratively solving the vector matrix equation of the IR Drop to generate the iterative value of the node voltage and the node current of each of the nodes;

when the error between two adjacent iteration values is less than the preset iteration error, recording the iteration value generated by the latest iteration as the node voltage value of each node, and calculating and generating the IR Drop data of all the nodes.

In an embodiment of the disclosure, the node compensation module 500 is used for performing the voltage compensation on each pixel in the display panel according to the IR Drop data. Specifically, according to the IR Drop data of each node in the display panel obtained by the iterative solution module 400, the accurate point-to-point voltage compensation is performed for each pixel, thereby improving the problem of uneven brightness of the high-resolution OLED display panel caused by the IR Drop, which improves the display effect of the display panel.

For specific limitations on the compensation system for the IR Drop of the display panel, please refer to the above limitations on the compensation method, which will not be described again here. Each module in the above compensation system may be realized in whole or in part through software, hardware and combinations thereof. Each of the above modules may be embedded in or independent of a processor of a computer device in a form of hardware, or may be stored in a memory of the computer device in a form of software, so that the processor may execute the operations corresponding to the above modules.

An embodiment of the disclosure further provides an electronic device. The electronic device includes one or more processors and a storage device for storing one or more programs. When the one or more programs are executed by the one or more processors, the electronic device is enabled to implement the compensation method for the IR Drop of the display panel in the above embodiments.

Figure 7:
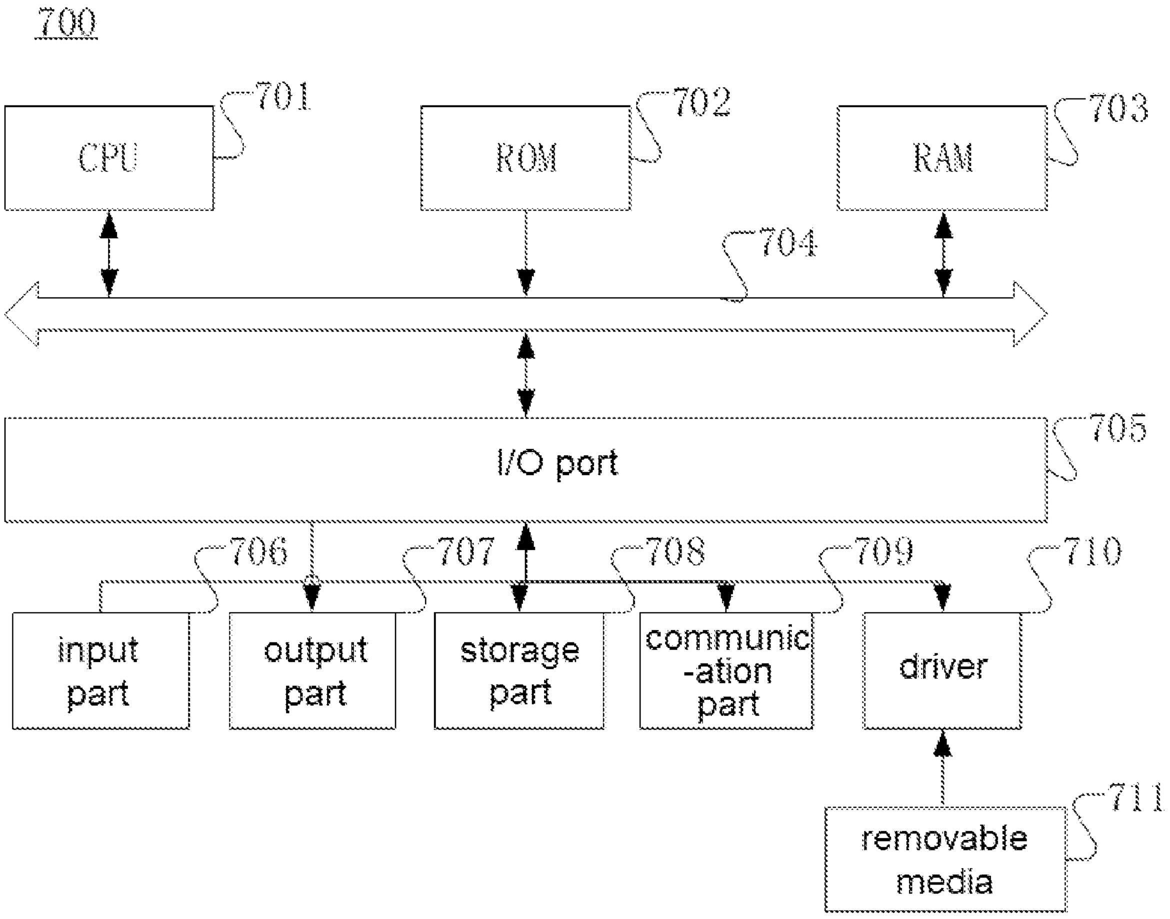
FIG. 7 is a schematic structural view of a computer system suitable for implementing an electronic device according to an embodiment of the disclosure.

Please refer to FIG. 7. FIG. 7 is a schematic structural view of a computer system suitable for implementing the electronic device according to an embodiment of the disclosure. It should be noted that a computer system 700 of the electronic device shown in FIG. 7 is only an example, and should not impose any restrictions on functions and scope of use of the embodiments of the disclosure.

Please refer to FIG. 7. The computer system 700 includes a central processing unit (CPU) 701, which may perform various appropriate actions and processes according to a program stored in a read-only memory (ROM) 702 or a program loaded to a random access memory (RAM) 703 from a storage part 708, such as performing the methods described in the above embodiments. In RAM 703, various programs and data required for system operation are also stored. The CPU 701, ROM 702, and RAM 703 are connected with each other through a bus 704. An input/output (I/O) port 705 is further connected with the bus 704.

Following components are connected to the I/O port 705: an input part 706 including a keyboard and a mouse, etc.; an output part 707 including a cathode ray tube (CRT), an organic light emitting diode (OLED), a liquid crystal display (LCD), etc. and a speaker, etc.; a storage part 708 including a hard disk, etc.; and a communication part 709 including a network port card such as a LAN (Local Area Network) card, a modem, and the like. The communication part 709 performs a communication processing via a network such as Internet. A driver 710 is also connected with the I/O port 705 as needed. A removable media 711, such as magnetic disk, optical disk, magneto-optical disk, semiconductor memory, etc., are mounted on the driver 710 as needed, so that a computer program read therefrom is mounted into the storage part 708 as needed.

In particular, according to embodiments of the disclosure, the processes described above with reference to the flowcharts may be implemented as computer software programs. For example, the embodiments of the disclosure include a computer program product including a computer program carried on a computer-readable medium, and the computer program includes a computer program for performing the method illustrated in the flowchart. In such embodiments, the computer program may be downloaded and installed from the network through the communication part 709 and/or installed from the removable media 711. When the computer program is executed by the central processing unit (CPU) 701, various functions defined in the system of the disclosure are performed.

It should be noted that the computer-readable medium shown in the embodiment of the disclosure may be a computer-readable signal medium or a computer-readable storage medium, or any combination of the above two. The computer-readable storage medium may be, for example, an electronic, magnetic, optical, electromagnetic, infrared, or semiconductor system, device or component, or any combination thereof. More specific examples of the computer readable storage media may include, but are not limited to: an electrical connection with one or more wires, a portable computer magnetic disk, a hard drive, a random access memory (RAM), a read-only memory (ROM), an erasable programmable read-only memory (EPROM), a flash memory, an optical fiber, a portable compact disc read-only memory (CD-ROM), an optical storage device, a magnetic storage device, or any combination thereof. In this disclosure, a computer-readable signal medium may include a data signal propagated in a baseband or as a part of a carrier wave carrying a computer-readable computer program therein. Such propagated data signals may be taken in many forms, including but not limited to electromagnetic signals, optical signals, or any suitable combination of the above. The computer-readable signal medium may also be any computer-readable medium other than the computer-readable storage medium that may send, propagate, or transport a program for use by or in connection with an instruction execution system, device, or component. Computer programs included on the computer-readable medium may be transmitted using any suitable medium, including but not limited to: wireless, wired, etc., or any suitable combination of the above.

The flowcharts and block views in the figures illustrate an architecture, functionality, and operation of possible implementations of the system, method, and computer program products according to various embodiments of the disclosure.

Wherein, each block in the flowchart or block view may represent a module, program segment, or part of code, which contains one or more executable instructions for implementing a specified logical function. It should also be noted that, in some alternative implementations, the functions noted in the block may occur out of an order noted in the figures. For example, two blocks shown one after another may actually execute substantially in parallel, or they may sometimes execute in a reverse order, depending on the functionality involved. It will also be noted that each block in the block view or flowchart illustration, and combinations of blocks in the block view or flowchart illustration, may be implemented by special purpose hardware-based systems that perform the specified functions or operations, or may be implemented by a combination of specialized hardware and computer instructions.

Units involved in the embodiments of the disclosure may be implemented in software or hardware, and the described units may also be arranged in the processor. Wherein, names of these units do not constitute a limitation on the unit itself under certain circumstances.

The disclosure further provides the computer-readable storage medium. The computer-readable storage medium stores the computer program. When the computer program is executed by the processor, the computer implements the compensation method of the IR Drop of the display panel as described in any one of the above. The computer-readable storage medium may be included in the electronic device described in the above embodiments, or may exist separately without being assembled into the electronic device.

The disclosure further provides the computer program product or computer program, the computer program product or computer program includes computer instructions stored in a computer-readable storage medium. The processor of the computer device reads the computer instructions from the computer-readable storage medium, and the processor executes the computer instructions, so that the computer device executes the compensation method of the IR Drop of the display panel provided in the above embodiments.

In summary, the disclosure provides the compensation method, system, device and medium of the IR Drop of the display panel, relating to the field of display technology The disclosure characterizes a IR Drop model along the power cable in the OLED display panel by constructing a vector matrix equation, and uses sparse algorithm to store the equivalent sub-matrix in the vector matrix equation of the IR Drop, thereby satisfying the need to solve large-scale circuit models and achieving an accurate point-to-point compensation of all nodes of the display panel. The disclosure may improve a problem of uneven brightness of the OLED display panel with the high resolution caused by the IR Drop, which improves display effect of the display panel.

The above embodiments only illustrate principles and effects of the disclosure, but are not intended to limit the disclosure. Anyone familiar with this technology may modify or change the above embodiments without departing from the scope of the disclosure. Therefore, all equivalent modifications or changes made by those with ordinary knowledge in the technical field should still be covered by the claims of the disclosure.

What is claimed is:

1. A compensation method of a IR Drop of a display panel, comprising:

constructing an IR Drop model of the display panel based on a distribution of equivalent resistances between adjacent pixels in the display panel;

constructing a vector matrix equation of the IR Drop according to the IR Drop model;

performing an equivalent processing on the vector matrix equation of the IR Drop to form a plurality of equivalent sub-matrices;

iteratively solving IR Drop data of each node in each equivalent sub-matrix; and performing a voltage compensation on each pixel in the display panel according to the IR Drop data;

wherein, a conductance value g of each node in the equivalent sub-matrix satisfies a following formula:

$$g = \frac{2}{R_{TD} + R_{EL}} + \frac{2}{R_{MD} + R_{EL}}$$

wherein, $R_{TD}$ represents an equivalent resistance of a horizontal power supply metal wire in the node, $R_{MD}$ represents an equivalent resistance of a longitudinal power supply metal wire in the node, and $R_{EL}$ represents an equivalent resistance of the pixel in the node.

2. The compensation method of the IR Drop of the display panel according to claim 1, wherein, constructing the IR Drop model of the display panel based on the distribution of equivalent resistances between adjacent pixels in the display panel comprises:

calculating the equivalent resistance between adjacent pixels in the display panel, and constructing the IR Drop model of the display panel according to all of the equivalent resistances.

3. The compensation method of the IR Drop of the display panel according to claim 1, wherein, in an operation of constructing the vector matrix equation of the IR Drop according to the IR Drop model, the vector matrix equation of the IR Drop satisfies a following formula:

$$Gv=I$$

wherein, G represents a conductance matrix, 17 represents a vector matrix consisting of node voltages, and I represents a vector matrix containing a current.

4. The compensation method of the IR Drop of the display panel according to claim 1, wherein, a current value I of each node in the equivalent sub-matrix satisfies a following formula:

$$I_{(x_i,y_i)}{}^{k+1}=-I_{(x_i,y_i)}{}^{k}+(v_{(x_i-1,y_i)}{}^{k+1}+v_{(x_i+1,y_i)}{}^{k})\times g_{MD}$$

wherein, k represents a number of iterative solutions, $v_{(xi+1,\ yi)}$ represents a node voltage of a node $(x_i+1,\ y_i)$, $v_{(xi-1,\ yi)}$ represents a node voltage of the node $(x_i-1,\ y_i)$, and $g_{MD}$ represents a longitudinal conductance of the node $(x_i+1,\ y_i)$.

5. The compensation method of the IR Drop of the display panel according to claim 1, wherein, iteratively solving the IR Drop data of each node in each equivalent sub-matrix comprises:

iteratively solving the vector matrix equation of the IR Drop to generate an iterative value of a node voltage and a node current of each of the nodes;

when an error between two adjacent iteration values is less than a preset iteration error, recording an iteration value generated by a latest iteration as a node voltage value of each node, and calculating and generating the IR Drop data of all the nodes.

6. The compensation method of the IR Drop of the display panel according to claim 1, wherein, in an operation of performing the equivalent processing on the vector matrix equation of the IR Drop to form the plurality of equivalent sub-matrices, the equivalent sub-matrix is stored through utilizing a sparse algorithm.

7. A computer device, comprising a memory, a processor and a computer program stored in the memory and executable on the processor, wherein, when the processor executes the computer program, operations of the compensation method of the IR Drop of the display panel according to claim 1 are implemented.

8. A computer-readable storage medium, storing a computer program, wherein, when the computer program is executed by a processor, operations of the compensation method of the IR Drop of the display panel according to claim 1 are implemented.

9. A compensation system of a IR Drop of a display panel, comprising:

a model construction module, configured to construct an IR Drop model of the display panel based on a distribution of equivalent resistances between adjacent pixels in the display panel;

a matrix construction module, configured to construct a vector matrix equation of the IR Drop according to the IR Drop model;

an equivalent processing module, configured to perform an equivalent processing on the vector matrix equation of the IR Drop to form a plurality of equivalent sub-matrices;

an iterative solution module, configured to iteratively solve IR Drop data of each node in each equivalent sub-matrix; and a node compensation module, configured to perform a voltage compensation on each pixel in the display panel according to the IR Drop data-;

wherein, a conductance value g of each node in the equivalent sub-matrix satisfies a following formula:

$$g=\frac{2}{R_{TD}+R_{EL}}+\frac{2}{R_{MD}+R_{EL}}$$

wherein, $R_{TD}$ represents an equivalent resistance of a horizontal power supply metal wire in the node, $R_{MD}$ represents an equivalent resistance of a longitudinal power supply metal wire in the node, and $R_{EL}$ represents an equivalent resistance of the pixel in the node.

* * * * *